United States Patent [19]

Bertin

[11] 4,434,706
[45] Mar. 6, 1984

[54] POWER-ASSISTED STEERING DEVICE FOR A VEHICLE

[75] Inventor: Patrice Bertin, Paris, France

[73] Assignee: Valeo, Societe Anonyme, Paris, France

[21] Appl. No.: 283,155

[22] Filed: Jul. 14, 1981

[30] Foreign Application Priority Data

Jul. 17, 1980 [FR] France .............................. 80 15790
Jun. 29, 1981 [FR] France .............................. 81 12714

[51] Int. Cl.³ .............................................. F15B 9/08
[52] U.S. Cl. ..................................... 91/375 A; 91/467
[58] Field of Search ................ 91/375 R, 375 A, 467, 91/374; 180/148; 137/625.21

[56] References Cited

U.S. PATENT DOCUMENTS

| | | | |
|---|---|---|---|
| 3,227,178 | 1/1966 | Elwell ............................. | 137/625.21 |
| 3,608,866 | 9/1971 | Karpacheva et al. ......... | 137/625.21 |
| 4,240,331 | 12/1980 | Nishikawa et al. ............ | 137/625.21 |
| 4,254,691 | 3/1981 | Dauvergne .......................... | 91/467 |

FOREIGN PATENT DOCUMENTS

| | | | |
|---|---|---|---|
| 307872 | 9/1918 | Fed. Rep. of Germany ........ | 91/467 |
| 2426818 | 12/1979 | France . | |
| 2452409 | 10/1980 | France . | |

*Primary Examiner*—Robert E. Garrett
*Assistant Examiner*—Richard L. Klein
*Attorney, Agent, or Firm*—Young & Thompson

[57] ABSTRACT

A power-assisted steering device for a vehicle comprises a two-part steering column which parts are capable of limited relative angular displacement, and a hydraulic power-assistance mechanism responsive by means of a hydraulic distributor to relative angular displacement of the parts. The distributor comprises a stator having a pressure orifice connected to a hydraulic pump, a return orifice connected to a fluid reservoir, and two service orifices connected to the assisting jack. Two adjacent rotors are located within the stator and these are rotatable respectively with said two parts, the first rotor having distribution passages interacting with the stator pressure and return orifices, and the second rotor having distribution passages interacting with the first rotor distribution passages and the stator service orifices. According to the invention, the stator pressure and return orifices communicate respectively with two chambers, one of which is peripheral and communicates directy with the first rotor distribution passages comprising apertures located in the outer periphery of the rotor, and the other of which is central and communicates directly with first rotor distribution passages comprising passages located adjacent the inner periphery of the rotor, the first rotor being located within the axial dimension of both of said chambers.

7 Claims, 6 Drawing Figures

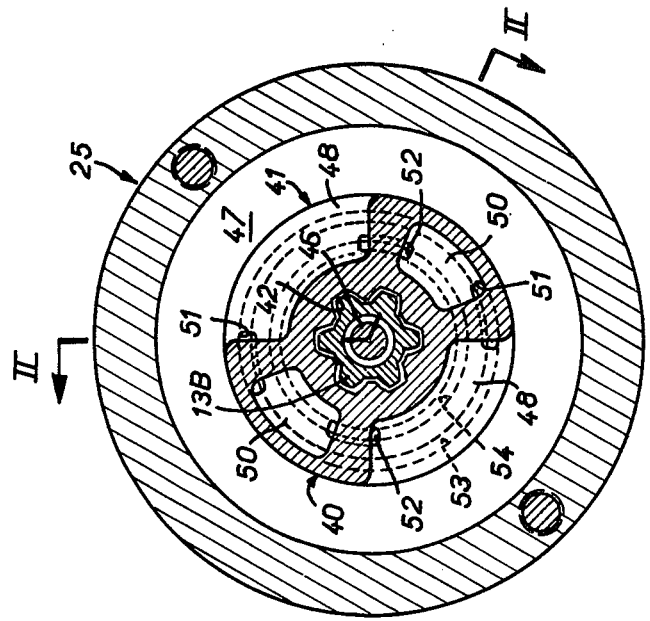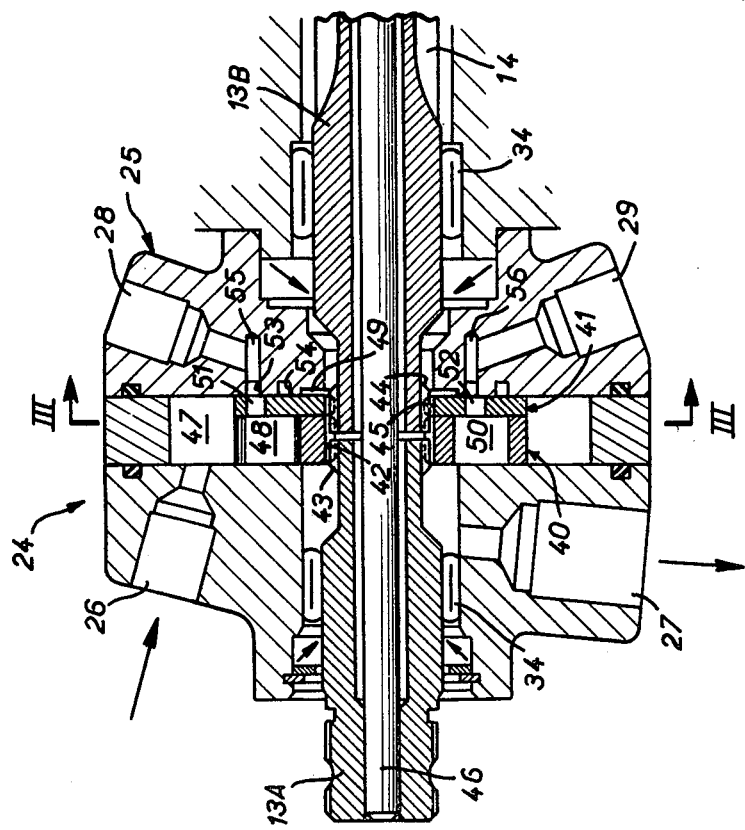

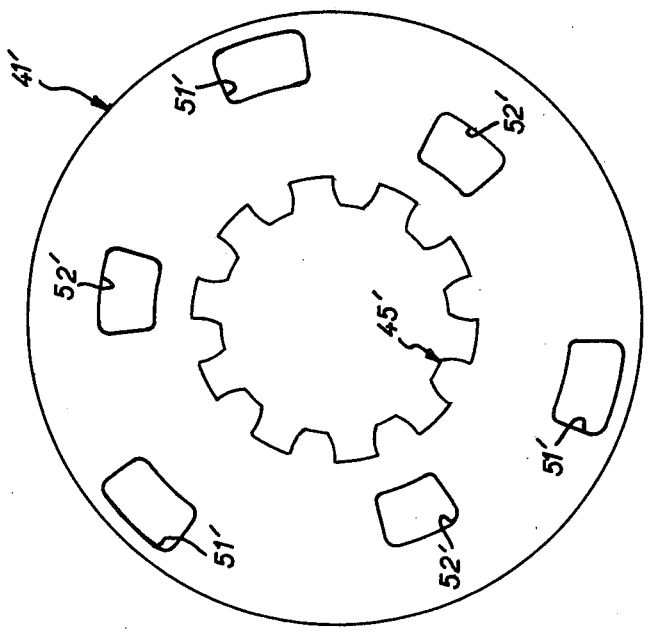
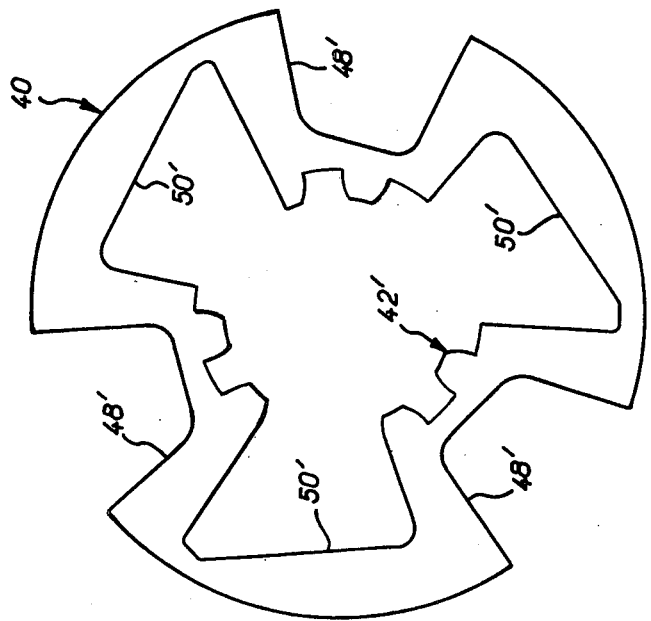

POWER-ASSISTED STEERING DEVICE FOR A VEHICLE

BACKGROUND OF THE INVENTION

The present invention relates to a power-assisted steering device for a vehicle, comprising control means acting upon steering means, said control means comprising a transmission element in two parts which parts are capable of limited relative angular displacement under the action of said control means, and power-assistance means which, in response to such angular displacement, act upon the steering means in the same sense as the control means. More particularly, the invention relates to such a device, in which the power-assistance means comprise a hydraulic unit having fluid-pressure means and a reservoir, an actuator acting upon the steering means, and a hydraulic distributor interposed between the hydraulic unit and the actuator.

The invention is concerned more specifically with a power-assisted device of this kind, in which the distributor comprises a stator which has a pressure orifice connected to the fluid-pressure means, a return orifice connected to the reservoir, and two service orifices connected to the actuator, and two adjacent rotors which are located within the stator and which rotate integrally with the two said parts of the transmission element respectively, a first of said rotors having distribution passages interacting with the pressure and return orifices of the stator, whilst the second rotor has distribution passages which interact both with the distribution passages of the first rotor and with the service orifices of the stator.

Generally in devices of this type, the fluid-pressure orifice feeds the pressure passages of the first rotor laterally. These passages occupy an intermediate position between the outer periphery and the inner periphery of the first rotor and feed some of the passages of the second rotor which feed the actuator, the return from which is effected via the other passages of the second rotor, then via channels which are formed on the outer periphery and on the inner periphery of the first rotor, whence the fluid returns to the reservoir or tank.

One known arrangement of this kind is generally satisfactory, but entails a considerable bulk both axially and radially, because the first rotor has passages both on its outer periphery and its inner periphery and in a region contained between these two peripheries.

The object of the present invention is a power-assisted steering device for a vehicle, of the kind described above, in which both the axial and the radial bulk of the device is reduced.

SUMMARY

According to the invention, the power-assisted steering device is characterised in that the pressure and return orifices of the stator communicate respectively with two chambers one of these chambers being peripheral and communicating directly with passages of the first rotor which consist of apertures located along the outer periphery thereof, whilst the other chamber is central and communicates directly with other passages of the first rotor which consist of apertures located adjacent the inner periphery thereof, the said first rotor being located within the axial dimension of both said chambers.

By means of this arrangement, both the outer periphery and the inner periphery are utilised, within the thickness of the first rotor, for the requirements of the supply of pressure and of the return to the reservoir. There is, therefore, an advantage in terms of bulk both radially and axially.

In one form of construction, the pressure orifice communicates with the peripheral chamber of the first rotor, whilst the return orifice communicates with the central chamber of said rotor.

In one embodiment, the outer apertures of the first rotor are provided in the form of open sectors, whilst the inner apertures consist of cutaway portions having a closed contour.

Alternatively, the outer apertures and the inner apertures of the first rotor consist of alternate open sectors, said first rotor thus having a tortuous annular shape. By means of this arrangement, this first rotor has an especially simple and robust construction and is convenient to produce.

BRIEF DESCRIPTION OF THE DRAWINGS

FIG. 2 is a view, on a larger scale, of this device, in a longitudinal section along the broken line II—II of FIG. 3;

FIG. 3 is a view of the device, in a cross-section along the line III—III of FIG. 2;

FIG. 5 is an elevation view of an alternative embodiment of the first rotor;

FIG. 6 is an elevation view of a corresponding alternative embodiment of the second rotor.

DETAILED DESCRIPTION OF THE PREFERRED EMBODIMENTS

Figure 1:
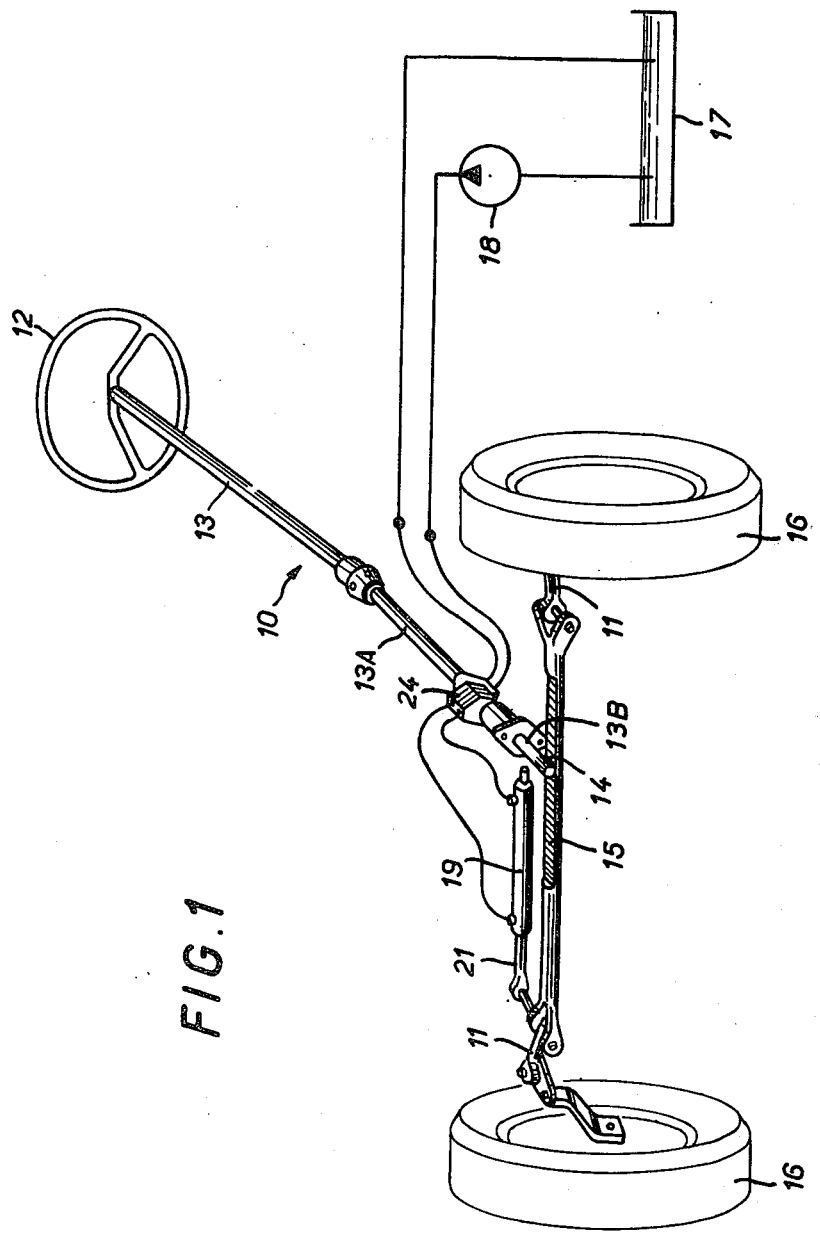
FIG. 1 is a diagrammatic view, in perspective, of a power-assisted steering device for a motor vehicle, according to the invention.

In the embodiment illustrated in FIGS. 1 to 4, a power-assisted steering device according to the invention is applied, by way of example, to a motor vehicle.

This device comprises (FIG. 1) control means 10 acting upon steering means in the form of track rods 11. The control means 10 comprise a steering-wheel 12 and a steering column 13. The latter incorporates two axially aligned parts 13A and 13B which are capable of limited relative angular displacement under the action of the control means. The part 13A is integral with the steering-wheel 12, whilst the part 13B is integral with a pinion 14 which engages a steering rack 15. The latter controls the orientation of the front wheels 16 of the vehicle through the track rods 11.

A hydraulic power-assistance unit 17, 18 comprises a reservoir 17 and fluid-pressure means 18. The latter consists of a pump drawing hydraulic fluid from the reservoir 17.

An actuator consists, in the example illustrated, of a hydraulic jack 19. The latter has a piston 20 (FIG. 4), the rod 21 of which acts upon the rack 15. The piston 20 defines two chambers 22 and 23 in the jack 19. The hydraulic jack 19 thus has two active sides.

A hydraulic distributor 24 is interposed between the hydraulic unit 17, 18 and the actuator 19 and is sensitive to any angular offset of the two parts 13A and 13B, whereby it causes the actuator jack 19 to act on the track rods 11 in the same direction as the control means.

Figure 4:
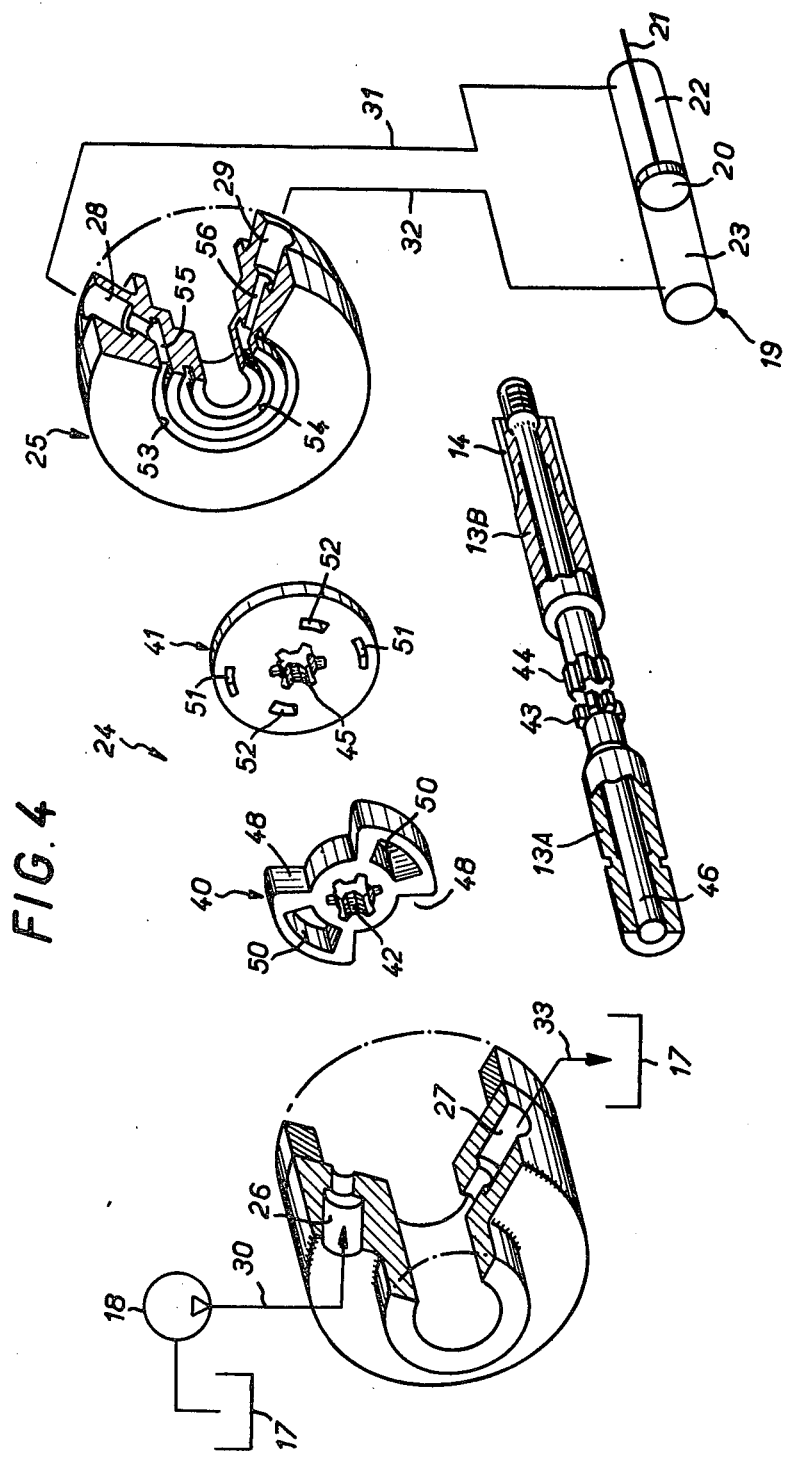
FIG. 4 is an exploded diagrammatic view, in perspective, of the device, showing the stator and the two rotors and, partially, the steering column.

The distributor 24 comprises a stator 25 having four orifices 26, 27, 28 and 29 (FIGS. 2 to 4).

The orifice 26 constitutes a pressure orifice connected by a channel 30 to the pump 18 of the hydraulic unit 17, 18. The orifices 28 and 29 constitute service orifices connected respectively by channels 31 and 32 to the two chambers 22 and 23 of the actuator 19. The orifice 27 constitutes a return orifice connected by a channel 33 to the tank 17.

The stator 25 surrounds the two parts 13A and 13B of the steering column and is radially located thereon by means of bearings 34.

The distributor 24 also possesses two adjacent rotors 40 and 41 which are disposed within the stator 25 and which rotate integrally with the two parts 13A and 13B of the steering column respectively.

The first rotor 40 is a disc rotatable integrally with the part 13A of the steering column, whilst the second rotor 41 is a disc rotatable integrally with the part 13B of the steering column.

The first disc 40 is thicker than the second disc 41. It has a splined central perforation 42 engaged, without angular play, on a splined bearing 43 of the part 13A and engaged, with angular play, on a splined bearing 44 of the part 13B. The other disc 41 has a splined central perforation 45 engaged, without play, on the splines 44 of the part 13B.

The play between the splines 43 and 44 defines the limited relative angular play mentioned above. This play is a few degrees on either side of a mean position of rest which tends to be restored and maintained by a torsion bar 46 coupling the parts 13A and 13B elastically.

The pressure orifice 26 communicates with a chamber 47. This chamber 47 is peripheral and communicates directly with passages 48 of the first rotor 40. These passages consist of apertures formed along the outer periphery of the first rotor 40. As will be seen from the drawings, particularly FIG. 2, the rotor 40 is disposed within the axial dimension of the chamber 47.

The return orifice 27 communicates with a chamber 49. This chamber 49 is central and communicates directly with passages 50 in the first rotor 40. These passages consist of apertures 50 adjacent the inner periphery of the first rotor 40. As may be seen more particularly in FIG. 3, the peripheral apertures 48 consist of two opposite open sectors, whilst the central apertures 50 consist of two opposite cutaway portions. Each cutaway portion 50 has a closed configuration. Rotor 40 is again located within the axial dimension of chamber 49.

The second disc 41 has two pairs of passages 51 and 52. The stator 25 possesses two concentric annular grooves 53 and 54 which are connected respectively to the orifices 28 and 29 of the stator 25 by channels 55 and 56. The passages 51 of the second disc 41 interact with the groove 53, whilst the passages 52 of the second disc 41 interact with the groove 54. The various passages 48 and 50 of the first rotor 40 interact with the various passages 51 and 52 of the second rotor 41.

In the absence of any action by the driver on the steering-wheel 12, the parts 13A and 13B are maintained in the rest position by the torsion bar 46. The delivery of the pump 18 passes via the channel 26 into the chamber 47 and reaches the passages 48, whatever the angular position of the rotor disc 40, and, from there, to the passages 51 and 52 which are themselves connected to the passages 50 communicating with the chamber 49 of return to the tank 17. The pressure of the pump therefore has no effect in the two chambers 22 and 23 of the jack 19. The installation functions with an open centre and the actuator jack 19 is not pressurized.

When the driver exerts action upon the steering-wheel 12 to steer the wheels 16, the parts 13A and 13B are offset relative to one another in a direction determined by the steering-wheel 12, and the relative angular position of the two discs 40 and 41 passes from the rest position to a working position in which the passages 48 have an increased overlap with the passages 51 and an increased uncovering of the passages 52, whilst the passages 50 have an increased uncovering of the passages 51 and an increased overlap with the passages 52.

Under these conditions, the delivery of the pump 18 passing from the orifice 26 into the chamber 47 is allowed preferentially via the passages 48 and 51 into the groove 53 and, from there, into the chamber 22 of the actuator jack. This chamber increases in volume by pushing the rod 21 in the desired steering direction. The chamber 23 of the actuator 19 decreases in volume, and its liquid is expelled via the channel 32 into the groove 54 and into the passages 52 communicating with the passages 50 which in turn communicate with the central chamber 49 connected to the return orifice 27 leading to the tank 17.

When the driver exerts action upon the steering-wheel 12 in the other direction, the operation is the same as that described, but is reversed.

In the event of failure of the power-assistance means, the effect, on steering, of the action upon the steering wheel 12 is to absorb the limited relative angular play between the parts 13A and 13B within the sets of teeth 43 and 44, by overcoming the elastic resistance provided by the torsion bar 46, and subsequently, by means of the rigid connection produced by the thick disc 40 which overlaps the sets of teeth 43 and 44, to drive the part 13B in rotation with the part 13A, thus ensuring stand-by steering.

The very compact construction of the device according to the invention will be appreciated, the device having bulk which is reduced both axially and diametrically, because two of the orifices of the stator, namely the orifices 26 and 27, communicate with the chambers 47 and 49, and the first rotor 40 is located within the axial extension of these chambers.

In the example illustrated (FIGS. 3 and 4), the rotor 40 is provided with two opposite lobes having the passages 50, but a greater number of lobes, for example three or more, can be provided.

It should be noted that the passages 50 can open out into the central perforation 42 of the rotor 40.

In an alternative embodiment (FIGS. 5 and 6), the device is, as a whole, similar to that described with reference to FIGS. 1 to 4. The reference numerals of FIGS. 1 to 4 have been used in FIGS. 5 and 6, but are followed by a prime.

In particular, this device comprises a distributor consisting of a first rotor 40' and a second rotor 41' disposed inside the stator and which rotate integrally with the two parts of the steering column respectively.

As in FIGS. 1 to 4, the first rotor 40' consists (FIG. 5) of a disc having a splined central perforation 42' and having passages 48' formed by outer apertures. These outer apertures 48' consist of three open sectors arranged with a circular symmetry.

The first rotor 40' also possesses passages 50' consisting of inner apertures. These inner apertures 50' are formed in three open sectors arranged with a circular symmetry and alternate with the peripheral sectors 48'.

The second rotor 41' (FIG. 6) consists of a disc 41' having a splined central perforation 45'. The disc 41' has three passages 51' and three other passages 52' alternate with the passages 51'. The various passages 51', 52' of the second rotor 41' interact with the various passages 48', 50' of the first rotor 40', in the same way as the passages 48, 50 and 51, 52 of the device described with reference to FIGS. 1 to 4.

The operation is similar to that described with reference to FIGS. 1 to 4.

The simple and robust construction of the first rotor 40' will be appreciated, the latter having, as may be seen from FIG. 5, a tortuous annular shape. It will also be noted that this first rotor 40' is convenient to produce.

I claim:

1. In a power-assisted steering device for a vehicle, comprising control means operable to act on steering means, said control means having a transmission element in two parts which parts are capable of limited relative angular displacement under the action of said control means, and power-assistance means responsive to relative angular displacement of said parts to act on said steering means in the same sense as the control means, said power-assistance means comprising a hydraulic unit having fluid-pressure means and a fluid reservoir, an actuator acting on the steering means, and a hydraulic distributor interposed between the hydraulic unit and the actuator, said distributor comprising a stator having a pressure orifice connected to the fluid-pressure means, a return orifice connected to the fluid reservoir, and two service orifices connected to the actuator, and two adjacent rotors, located within the stator and which are respectively operable to rotate integrally with said two parts of the transmission element, a first of said rotors having distribution passages interacting with said pressure and return orifices, whilst the second rotor is provided with distribution passages which interact both with the distribution passages of the first rotor 40 and with the service orifices of the stator the improvement in which the pressure orifice and return orifice of the stator communicate respectively with two chambers, one of these chambers being a peripheral chamber and communicating directly with distribution passages of the first rotor, which passages comprise apertures located along the outer periphery of the first rotor, whilst the other chamber is a central chamber and communicates directly with other distribution passages of the first rotor, which passages comprise apertures located adjacent the inner periphery of the first rotor, said first rotor being located within the axial dimension of both of said chambers.

2. A power-assisted steering device according to claim 1, wherein said pressure orifice communicates with said peripheral chamber, whilst the return orifice communicates with said central chamber.

3. A power-assisted steering device according to claim 1, wherein the passages of the second rotor communicate with two annular grooves formed in the stator and which communicate with the service orifices of the stator.

4. A power-assisted steering device according to claim 1, wherein the apertures located in the outer periphery of the first rotor consist of open sectors, whilst the apertures adjacent the inner periphery consist of cutaway portions having a closed configuration.

5. A power-assisted steering device according to claim 4, wherein the apertures located in the outer periphery are two in number, and the apertures located adjacent the inner periphery are also two in number.

6. A power-assisted steering device according to claim 1, wherein the outer apertures and the inner apertures of the first rotor consist of alternate open sectors, said first rotor thus having a tortuous annular shape.

7. A power-assisted steering device according to claim 6, wherein said open sectors are three in number both as regards the outer apertures and as regards the inner apertures.

* * * * *